March 10, 1931. E GRAVATT 1,795,856
HAND TRUCK
Filed Dec. 14, 1927
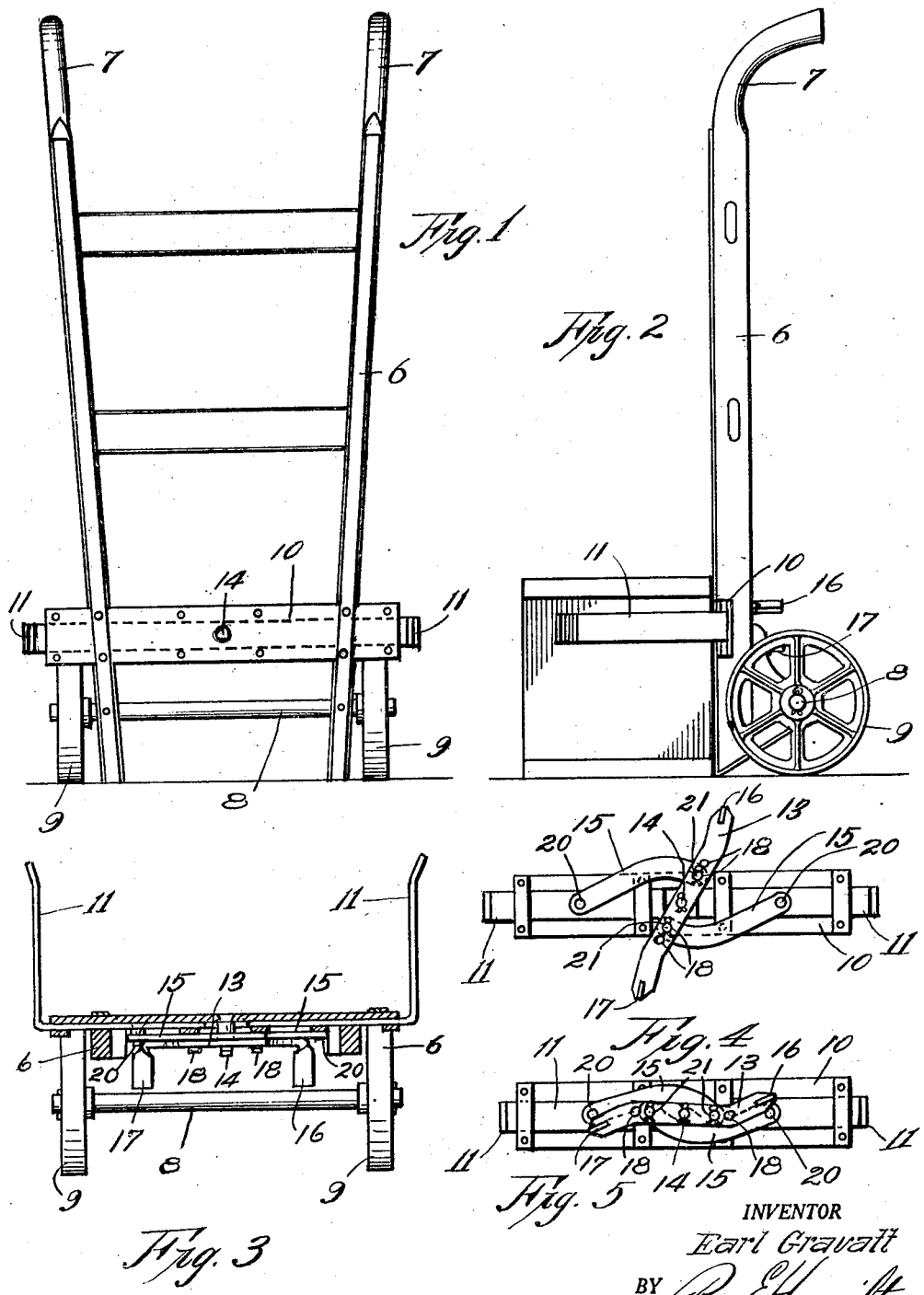
INVENTOR
Earl Gravatt
BY Roy E Hamilton
ATTORNEY Patented Mar. 10, 1931

1,795,856

UNITED STATES PATENT OFFICE

EARL GRAVATT, OF NORTH KANSAS CITY, MISSOURI, ASSIGNOR TO KANSAS CITY MILL-WRIGHT COMPANY, A COPARTNERSHIP, OF NORTH KANSAS CITY, MISSOURI

HAND TRUCK

Application filed December 14, 1927. Serial No. 239,871.

This invention relates to hand trucks and particularly to that type which is adapted to securely grip the article to be carried during the process of loading and carrying.

An object of this invention is to provide a hand truck having adjustable gripping jaws to securely retain the article to be loaded and carried.

A further object is the provision of a hand truck having gripping jaws with means for locking the same in the closed position.

With these general objects in view, as well as minor objects, which will appear during the course of the detailed specification, the invention will now be described with reference to the accompanying drawing illustrating a construction embodying the improvement of this invention.

In the drawing—

Figure 1, is a front elevation of a hand truck in the vertical position, embodying this invention.

Fig. 2, is a side elevation of a truck with a crate in position to be loaded and carried by the truck.

Fig. 3, is a sectional plan view taken through the jaws with some of the parts left in elevation.

Fig. 4, is a rear elevation of a portion of the truck showing the gipping jaws in the open position, and Fig. 5, is a similar view with the gripping jaws locked in the closed position.

Similar reference characters designate like parts throughout the several views, and the numeral 6 designates a truck body provided with hand grips 7 and an axle 8 securely carried thereby, on which is rotatably mounted wheels 9.

As shown in Fig. 2, when the truck body is in the vertical position, its lower portion will rest on the floor so that this support in conjunction with the wheel support will maintain the frame in a vertical position.

A frame work 10, having suitable guide members is securely attached to the truck body and extends beyond both sides thereof. This frame is mounted in said body below the upper surface thereof so as not to interfere with the proper seating of the article to be carried. A pair of substantially right angled gripping jaws 11 are slidably mounted in frame 10 in such a manner as to have one arm of each extending beyond and above the truck body, to grip the article to be loaded and carried.

As clearly shown in Figs. 4 and 5, the gripping jaws 11 are mounted in the frame 10 with their adjacent ends spaced apart to allow for movement of said jaws toward and from each other without interfering with other parts of the mechanism. The jaws 11 are movable toward and from each other by means of a lever and link mechanism consisting of a lever 13, which is pivoted intermediate its ends to the frame 10 by pivot 14, and two links 15, one end of each being pivoted to one of the inturned arms of the jaws 11, respectively, as at 20, while the other end of each of said links is pivoted to the operating lever 13 equi-distant from, and on opposite sides of, the pivotal point 14, respectively, by means of pivot 21.

It will be noted that when the gripping parts are in the position shown in Fig. 4, the jaws 11 are separated to receive an article, such as an egg case, therebetween, and when so positioned, the egg case may be securely gripped by moving the jaws toward each other to the position shown in Fig. 5, and when so gripped will retain its position relative to the truck as the truck is moved to any angle, and will so remain until the jaws are again released and moved apart to the open position.

As shown in Fig. 5, the pivots 21, when moved to the clamping position pass the center line of the two pivots 20 and the center pivot 14, and the links engage each other, thereby locking the gripping jaws against accidental opening movement.

For convenience of operating lever 13, pedals 16 and 17 are provided at the opposite ends thereof, thus making it possible for the operator to manipulate the gripping jaws with his foot. To close the gripping jaws the operator pushes downwardly on pedal 16, while to release it, pedal 17 is pressed downwardly. It is evident that one lever would suffice, if the operator would push downwardly to lock the jaws and lift upwardly on the same lever to open the jaws. If desired, more than one set of gripping jaws with operating mechanisms could be mounted on the same hand truck, however, more than one article may be loaded and carried on the truck, as shown, by simply stacking the articles and gripping the lower article.

This truck is particularly adapted for lifting and carrying egg crates and the like, since it eliminates most of the rough handling that is usually encountered when the old type truck is used, and also, there is no chance of damage, due to crates slipping from the truck when in transit. In order to obtain different spacings between gripping jaws 11 when in the closed position, a plurality of holes 18 are provided in the lever 13 on each side of the pivotal point 14, in which the pivots 21 may be inserted, thus varying the distance of the pivotal point of links 15 from the pivotal point 14, thereby increasing or decreasing the distance between the gripping jaws 11 when in the closed position.

I do not limit this invention to the construction shown and described, as many modifications may be made within the scope of the appended claims without departing from the spirit thereof.

What is claimed as new and desired to be secured by Letters Patent is:

1. A hand truck, comprising a truck body, wheels carried by said body, gripping jaws mounted for rectilinear movement on said body intermediate its ends and extending above the upper surface thereof, a pivotally mounted operating lever carried by said truck body, and a connecting link joining each of said gripping jaws to said operating lever, whereby, when said operating lever is oscillated in its pivot, said gripping jaws are moved toward or from each other.

2. A hand truck, comprising a truck body, wheels carried by said body, gripping jaws mounted for rectilinear movement on said body intermediate its ends and extending above the upper surface thereof, an operating lever pivotally mounted intermediate its ends on the truck body between adjacent ends of said gripping jaws, a connecting link connecting each of said gripping jaws to said operating lever whereby when said operating lever is oscillated on its pivot said gripping jaws will be reciprocated toward or from each other.

3. A hand truck, comprising a truck body, wheels carried by said body, spaced apart gripping jaws mounted in alinement on said body intermediate its ends and extending above the upper surface thereof, guide members adapted to maintain said gripping jaws in longitudinal alinement, an operating lever having a foot pedal at each end thereof pivoted adjacent its center portion between the adjacent ends of said gripping jaws, a connecting link connecting each of said gripping jaws to said operating lever whereby when said operating lever is oscillated on its pivot said gripping jaws will be reciprocated toward or from each other.

In testimony whereof, I hereunto affix my signature.

EARL GRAVATT.